(No Model.) 3 Sheets—Sheet 1.
T. F. O'CONNOR.
ELECTRIC RAILWAY.
No. 553,176. Patented Jan. 14, 1896.
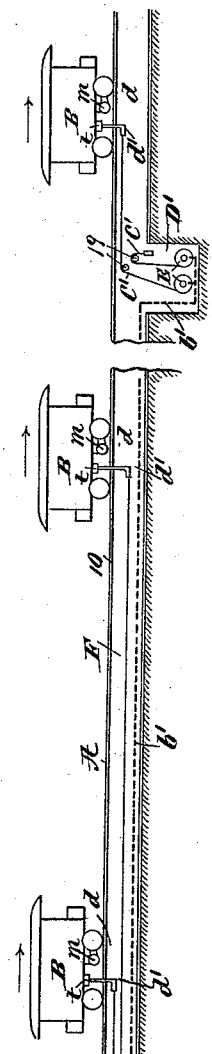
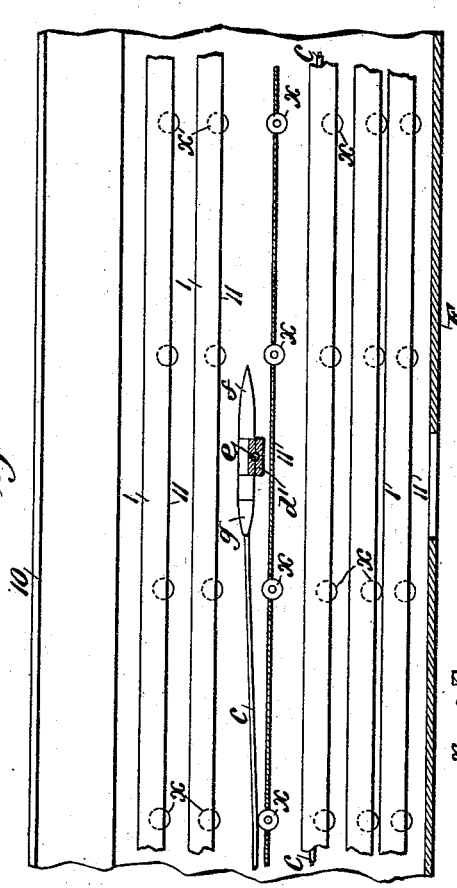
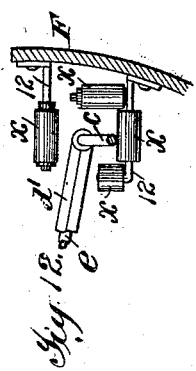
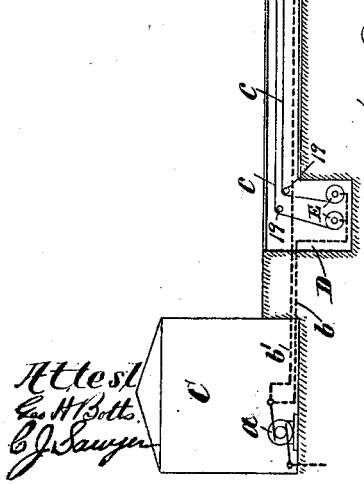
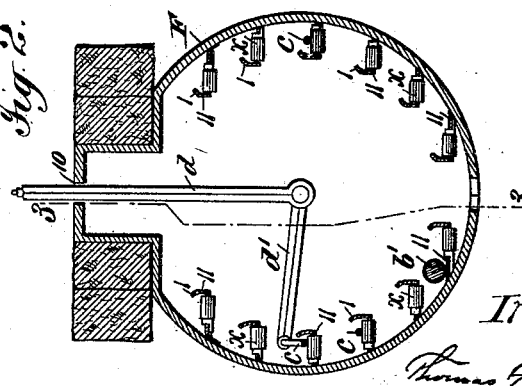

(No Model.) 3 Sheets—Sheet 2.
T. F. O'CONNOR.
ELECTRIC RAILWAY.
No. 553,176. Patented Jan. 14, 1896.
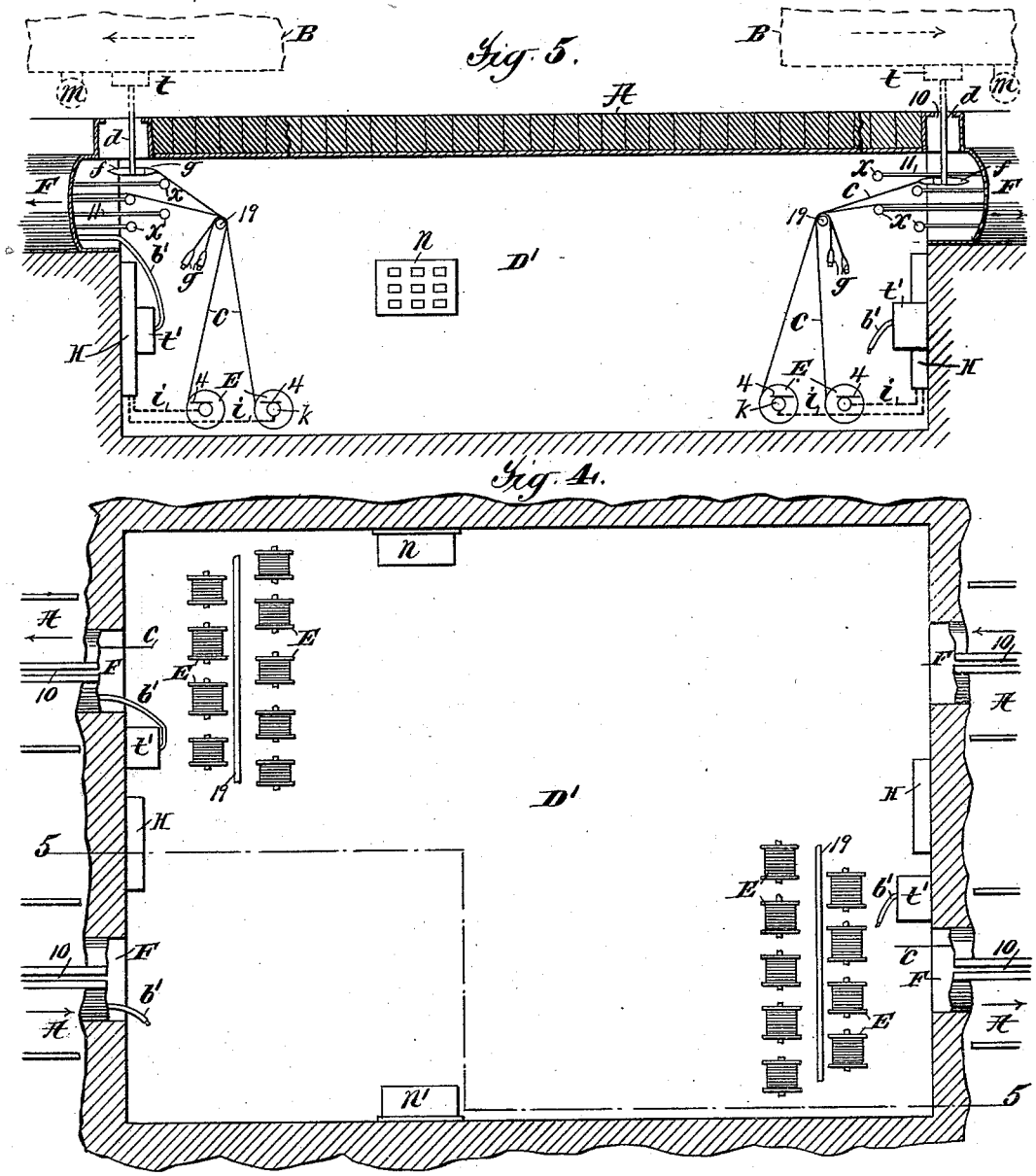
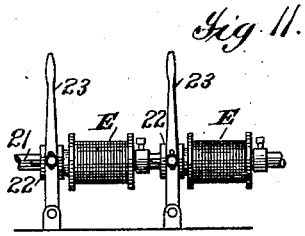
Attest:
Geo. H. Botts.
C. J. Sawyer
Inventor:
Thomas F. O'Connor
by Philipp Immen and Phelps
Attys
ANDREW B. GRAHAM, PHOTO-LITHO, WASHINGTON, D.C.

(No Model.) 3 Sheets—Sheet 3.
T. F. O'CONNOR.
ELECTRIC RAILWAY.
No. 553,176. Patented Jan. 14, 1896.
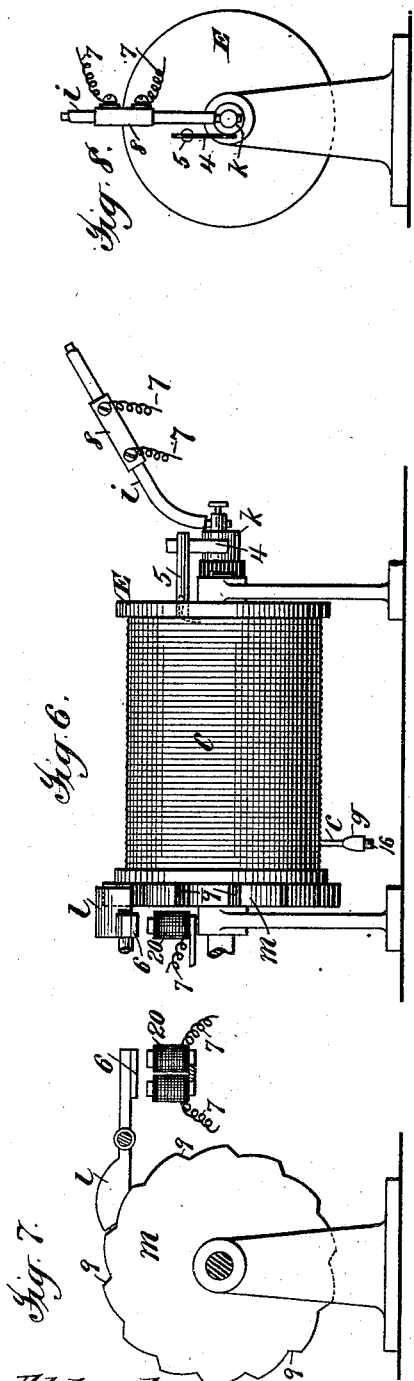
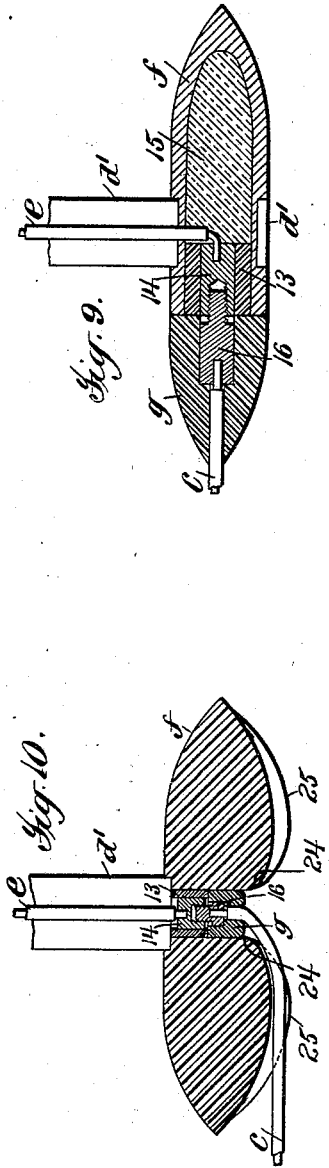
Attest:
Geo H Botts
E J Sawyer
Inventor:
Thomas F O'Connor
By Philipp Munson & Phelps,
Attys

UNITED STATES PATENT OFFICE.

THOMAS F. O'CONNOR, OF NEW YORK, N. Y.

ELECTRIC RAILWAY.

SPECIFICATION forming part of Letters Patent No. 553,176, dated January 14, 1896.

Application filed April 2, 1894. Serial No. 506,045. (No model.)

*To all whom it may concern:*

Be it known that I, THOMAS F. O'CONNOR, a citizen of the United States, residing at New York, county of New York, and State of New York, have invented certain new and useful Improvements in Electric Railways, fully described and represented in the following specification and the accompanying drawings, forming a part of the same.

The object of the present invention is to provide an improved electric-railway system in which the motors on the cars or other vehicles are fed by separate conductors, each conductor having one end connected to and moving with the vehicle fed by it and the other end connected with the source of power and stationary as respects the movement of the vehicle, the length of the conductor being sufficient to permit the vehicle to move the desired distance from the stationary end of the conductor. It is obvious that in such a system the only points of the conductors with which electrical contact is to be made are the ends, at one of which the conductors connect with the source of power and at the other with the motors. The electric conductors, therefore, may be covered and fully insulated throughout in any suitable manner, and by using suitable waterproof insulation it is obvious that the conductors may be used without leakage, independently of moisture, as in the case of insulated electric cables in present use for other purposes.

While certain specific features of the invention may be embodied in constructions not employing a conduit, it will be found preferable in practice to use a conduit through which the conductors will pass, and important features of the invention consist in conduit constructions with the motor-vehicles connected to the conductors within the conduit, and this connection is preferably formed by an arm on the motor-vehicle passing into the conduit through a slot, as usual in other systems, the electrical connection through this arm to the motor being made in any suitable or common manner, as in the trolley systems now in use. This conduit may be above or below ground, making either an overhead or underground system, there being obvious advantages even in an overhead system over the present overhead trolley systems, in that the conductors are covered and fully insulated, avoiding danger of short-circuiting and of leakage, thus enabling high voltage to be used without danger or loss. This system is, however, especially well adapted for use with an underground conduit and will preferably be thus used. The electric conductors may be arranged and supported in any convenient manner, but will preferably be carried upon reels, so that the portion of the conductor in excess of the distance of the motor-vehicle from the source of power may be reeled up and the length of the extended portion of the conductor be conveniently varied as the distance of the vehicle from the source of power increases or diminishes, the connection between the source of power and conductor upon the reel being made in any suitable manner permitting the rotation of the latter. While it is of course possible that the reels be carried by the motor-vehicles, it is obviously preferable that the reels should be stationary and that the motor-vehicles should carry the free ends of the conductors which are connected with the motors. The motor-vehicles may start at the reels and travel from them, and the conductor be unreeled as the distance of the vehicle from the reel is increased, and when the vehicle has reached the end of its travel or the distance it is to be fed by this conductor the end of the conductor be dropped by the vehicle and the reel be rotated by hand or power to reel up the conductor for use with another vehicle; or the motor-vehicle may be connected to the end of the conductor while it is drawn out from the reel and the motor-vehicle travel toward the reel, the conductor being reeled up at the same rate of speed as the vehicle travels, it being thus possible to provide a system in which the same conductor shall feed motors traveling in both directions and a vehicle go and return fed by the same conductor. When the car travels toward the reel any simple means may be used for stopping the reeling of the conductor in case the motor-vehicle stops, and for accommodating the speed of reeling to the movement of the vehicle—as, for instance, by driving the reel by a friction-clutch, the friction being sufficient to take up the slack, but permitting the clutch to slip upon excess of tension upon the conductor. In either case a suitable brake device will preferably be used to avoid the effect of momentum upon the reel when the vehicle stops or slows up.

The invention may be applied either in a system in which the rails are used for return or in which a return-wire is used. In the latter case a duplex cable will preferably be used, providing only a single strand to be connected with the vehicle and the connection being made therewith by a single operation, as in the case of a single conductor. It will be found in practice that the service-conductor may be quite small, especially when the ground return is used, even with currents of the character now used in electric systems, and this size may be reduced so that a very small conductor may be used by employing a high-voltage alternating current in the conductor and using a transformer upon the motor-vehicle, or by using a high-voltage direct current and transformer, either of which is made possible by the system without danger or loss, on account of the full insulation of the conductors. Instead of taking a high-voltage current through the service-conductor and reducing it on the cars, it may be used only on the feeders, when the latter are employed, and be reduced to any desired voltage by transformers at the ends of the feeders, and an alternating current may be used in the feeders only, a suitable rotary transformer being used at the end of each feeder to change the current from alternating to direct for the service-conductor, thus reducing the size of the feeder-cables and saving considerably in their cost. By using transformers both at the end of the feeder and on the cars the size of both the feeders and the service-conductors may be reduced, using on the feeders a very high voltage and on the service-conductors a somewhat lower voltage, but high enough to permit the use of a conductor of convenient size.

If the system be applied to a short line, a single reel and conductor for each vehicle operated may be found sufficient, but in longer lines it will be necessary, or at least desirable, to divide the line into sections and provide reels and conductors for each section. In such a sectioned system a motor-vehicle will be connected to a conductor at the beginning of a section, suitable vaults being provided for operators at such points, and a motor will be fed by this conductor during its travel over that section. At the end of the section this conductor will be detached from the motor and another conductor attached for the next section, and so on to the end of the line. If the conductors are unreeled as the vehicles advance, it will be necessary to return a conductor which has been unreeled and detached to the beginning of the section for use with another vehicle, and for this purpose the reel may be always under tension sufficient to return the conductor after it is detached from the vehicle. This, however, will increase the vehicle load and it will probably be found preferable to have the reel free to rotate as the conductor is unwound. The operator at the beginning of the section may then be notified when the conductor is released at the end of the section and the conductor then be reeled up. This may readily be provided for by a suitable annunciator system between different stations by which the proper time for reeling up a certain conductor may be indicated at the home station.

Any suitable construction of conduit may be used providing for the requisite number of conductors, and certain features of the invention may be embodied in constructions for use on lines where only a single conductor is used on the line or on each section. The present invention, however, includes certain important features by which a system is provided which may be adapted for use with any required number of vehicles and conductors in use upon a section simultaneously by subdividing the conduit so as to provide a separate space for each conductor. This may conveniently be done by partitions or supports on each side of the conduit, forming separate ducts, through which the different conductors run, a suitable system of antifriction-rollers being provided for reducing friction of the conductors and keeping them in place on curves or grades, as it is obvious will be desirable. The same result of reducing friction may be obtained by providing each conductor with small antifriction-balls placed thereon at intervals—for instance, by bands carrying balls clasped about the conductors. In this subdivided conduit the different conductors will lie at different elevations and at different distances from the center of the conduit, and connection therewith may be made from the motor-vehicles by providing the latter with arms of different lengths or forms for connection with conductors in the different ducts; but it will probably be found preferable to provide such a construction that the arms on the vehicles may be uniform and connection be made with a conductor in any one of the ducts. This result may be attained by making the conduit circular in form and providing the vehicle-arms with a pivoted section adapted to swing inside the conduit about said circle and form connection with any of the different conductors, or a conduit of other cross-section may be used by making the swinging portion of the arm adjustable in length for the different ducts, or by any other suitable construction of the means for connecting the end of the conductor with the motor.

It is obvious that a generator may be used at each station—that is, for each station of the line; but this invention provides a system possessing great advantages over those now in use, in that a single power-house may be used for a very long line or a large number of lines, on account of avoiding loss by leakage and the fact that currents of high voltage may be employed, reducing largely the size of the conductors and the cost of copper or other conducting material, which have practically limited the length of line operated from a single power-house in constructions heretofore in use.

When feeder-cables are used, through which different sections of the road are supplied from a single power-house, they may be laid in any suitable manner, either within or without the conduit, but it will probably be found preferable, for convenience of access, to run these feeder-cables through the conduit with the service-conductors either in ducts separate from the conductors for the motors or otherwise, as found preferable. These feeder-cables should have water-tight terminals and the connection for the different conductors be made through a switchboard, both these features being of any common or suitable construction.

As the construction of systems embodying the present invention may be varied so widely, and will depend upon the length and character of the line and the number of cars to be run, it is impossible to show all the forms of embodiment which may be found preferable under different circumstances, but for the purpose of illustration there is shown in the accompanying drawings, largely in diagram, a simple arrangement of underground electric-railway system embodying the invention, and adapted for use with a considerable number of cars, and a detailed description thereof will now be given and the features embodying the invention then specifically pointed out in the claims.

In the drawings, Figure 1 is a diagram of a system showing the power-house and vaults for two sections of the way, with insulated conductors or service-cables for one track. Fig. 2 is a cross-section of the conduit, showing one of the service-cables connected to a motor-arm. Fig. 3 is a vertical section of the same on the line 3 of Fig. 2, looking to the left. Fig. 4 is a horizontal section of one of the vaults for both tracks, the section being taken through the conduits. Fig. 5 is a vertical longitudinal section through the vault on the line 5 of Fig. 4. Fig. 6 is a detail side elevation of one of the reels with the service-cable reeled up. Figs. 7 and 8 are respectively opposite end elevations of the same. Fig. 9 is a detail of a simple form of connection for the conductor with the motor-arm. Fig. 10 shows a modified construction for the same connection. Fig. 11 shows a construction that may be used for driving the reels when the cars are moving toward them, or for reeling up the cables when detached from the cars. Fig. 12 is a detail hereinafter referred to.

Referring to said drawings, it will be understood that it is impossible to show accurately the relative sizes of the parts, especially in the diagram, Fig. 1, and that the sizes of some parts have been exaggerated for the purpose of illustration. The power-house is shown as separate from the first section of the way, and two feeder-cables have been shown, one for each of the two sections of the way illustrated. It will be understood, however, that this is only for the purpose of clear illustration of the general features of the new system, and that the invention may be embodied in a railway having but one section, and that the power-house may contain service-cables, such a one-section railway having no feeder-cables except that if both the outward and return cars move from reels carrying the service-cables, and a power-house be used at only one end of the way, a feeder-cable will be run to the other end of the way for the return service-cables. It will be understood, also, that the railway may have many sections, and that in such case a power-house may be used for each section, no feeder-cables being employed, or that one or any desired number of power-houses may be used with feeder-cables for the sections having no power-house.

In the drawings, A is the way along which the cars B are moving in the direction indicated by the arrows, it being assumed that the system employed is that first above described, in which the cars move only from the reels.

C is the power-house at which is located the generator $a$, and D D' the first and second vaults to which the current is transmitted from the generator $a$ by the respective feeder-cables $b$ $b'$, (shown in dotted lines,) the feeder-cable $b$ terminating at the first vault D and the feeder-cable $b'$ terminating at the second vault D', so as to furnish power for the outward track on the second section of the way and for the inward track of the first section, if desired. Within the vaults D D' are the reels E, carrying the service-cables $c$ $c'$ for the first and second sections of the way, two conductors and cars being shown in Fig. 1 as in use on the first section and one on the second, these service-cables being connected at their ends to the motor-arms $d$, which are carried by the cars and extend into the conduit F through the usual slot 10 in which they travel.

As illustrated, transformers are used on the cars, the arms $d$ connecting with such transformers and the current passing from the transformer to the motor $m$. It will be understood that the system may be used without transformers and that such transformers may be of any suitable form for alternating or direct currents, according to which is used.

The conduit F is provided on each side with a series of supports 11, forming separate ducts for the different service-cables, these supports being shown in Figs. 2 and 3 as consisting of plates having their inner edges bent upward to form flanges 1, by which the drawing of the service-cables out of their ducts is prevented. For the purpose of reducing friction the service-cables $c$ run on antifriction-rollers $x$, which are arranged at suitable distances along the supports 11, and it will be understood that no supports may be used between the rollers and only the arms for carrying the latter be employed, the arms extending from the walls of the conduit at suitable distances apart. The antifriction-rollers $x$ will be arranged below, above or on either side of the service-cables, as required, according to the grade or curve of the track and conduit, and any suitable system may be used, or balls carried by the cables substituted for the rollers, in which case the supports 11 should be continuous. In Fig. 12 is shown in detail an arrangement of rollers $x$ on all sides of the cable, the four rollers being carried by arms 12, the bottom and side rollers being carried by a single arm. It will be understood, however, that rollers on all sides at the same point will hardly be required, but it may be found desirable to use rollers on the inner side of the duct as well as on the under side at suitable distances throughout the conduit, rollers above or on the inner side of the conduit being used only when required on upgrades or curves.

It is possible to vary the length and form of the motor-arms $d$ for the different cars, so as to connect each car only with a cable in a certain duct, but it is preferable that the motor-arms should be uniform and connect with a cable in any one of the ducts. A simple construction is shown for this purpose in which the conduit F is made circular in cross-section, and the motor-arm $d$ is provided with an extension $d'$, swinging vertically, so as to be connected with any one of the service-cables. The motor-arm $d$ and its extension $d'$ are preferably of the form shown in section in Figs. 3 and 9, consisting of two plates between which the covered conductor $e$ passes from the motor to the connection with the service-cable, so that the conductor from the motor is fully inclosed and protected.

Any suitable connection may be used between the motor-arm and the service-cable, but this connection should be fully insulated and waterproof. As shown in Fig. 9, the swinging extension $d'$ of the motor-arm is provided with a carrier $f$, preferably closed at its forward end and made oval in form so as to facilitate its progress through the conduit. Within the carrier $f$ is rigidly fixed a strong insulating-sleeve 13, in which is mounted a brass contact-piece 14, provided with a screw-socket at the outer end, and with which the conductor $e$ from the motor connects. All the space within the carrier $f$ inside the brass contact-piece 14 is preferably filled with a suitable insulating-filling 15. The cable $c$ carries at the end a head $g$ of strong insulating material, the rear end of this head preferably being of the same form as the carrier to facilitate the return of the cable, in which head is set the brass contact-piece 16 having a screw-threaded nipple adapted to enter the screw-threaded socket in the contact-piece 14, and with which the conductor in the cable $c$ makes contact. In making the connection the ends of the head $g$ and disk 13 are drawn tightly together by the screwing of the contact-pieces 14 16 together, and a fully insulated and practically water-tight connection made. In order that the connection may not come apart the operator in making the joint simply turns the cable $c$ reversely more times than the threads of the screw, and then applies it to the contact-piece 14 and screws it up. The tendency of the joint will then be to tighten instead of loosen. This is a convenient form of connection for a single conductor; but it is obviously not suited for a construction employing a return-wire and duplex cable. Any common or suitable form of contact may be substituted for the screw-socket and nipple when duplex cables are used and two contacts required, and the cable head and carrier may be held together by a catch or other fastening of any suitable form.

In Fig. 10 is shown a connection which will be found preferable when, as hereinafter described, the car travels toward the reel and then passes the reel and travels from it on the same cable. In such case it is evident that the service-cable will be doubled back at the connection and the sharp bend thus formed, unless the carrier be reversed, will be objectionable. The construction shown in Fig. 10 is substantially the same as that in Fig. 9, except that the connection of the service-cable is made at the lower side of the carrier. The carrier is preferably recessed to receive the cable-head, and the recess preferably provided with inclined or curved sides 24 to avoid a sharp bend of the cable, and the carrier is preferably provided with longitudinal grooves 25 on the lower side, receiving and protecting the cable as the carrier moves in either direction. The carrier $f$ in this construction is preferably made of insulating material, so as to avoid electrical connection with the cable if the covering of the latter becomes worn against the carrier.

In Figs. 4 and 5 the interior arrangements of the vaults are shown, these views showing a single vault used for both tracks, and the reels for the two tracks arranged at opposite ends of the vault. The service-cables $c$ from the reels pass upward over bars 19, which will preferably be provided with antifriction devices, and thus to the different ducts of the conduit, the reels being shown as arranged in two rows and staggered so as to bring the ends of the service-cables closer together in passing from the reels to the conduit. The feeder-cables $b'$ are shown as passing to transformers $t'$, the system being illustrated as employing transformers both in the vaults and on the cars, as above described. From the transformers $t'$ connection is made to switchboards H, which switchboards may be of any suitable construction, and from which connection is made with the service-cables on the reels E through cables or other connections $i\ i$.

It is desirable that means of communication between adjacent vaults be provided, and for this purpose some suitable signaling system will preferably be used. It will probably be found preferable, however, to use an annunciator system indicating the different reels, especially in systems in which the service-cable is reeled up by the operator at the home vault after being drawn out from the reel with a car. This is also desirable in other systems in which the cable is returned with a car, as in case of accident to a cable in use or its being dropped by a car, signal for its return may readily be given.

In Figs. 4 and 5 two annunciators $n\ n'$ for the different tracks are shown.

Suitable details of construction of the reels and connections are shown in Figs. 6 to 8, the cable $i$ connecting with a contact-sleeve $k$ mounted concentrically with the reel, but stationary, and about which rotates with the reel a brush 4 carried by a brush-arm 5 on the end of the reel, and with which the end of the service-cable $c$ on the reel makes contact through an opening in the reel-head. It is desirable that some means should be provided by which the momentum of the reel shall be prevented from rotating the latter when the car stops or slows up. This result may be attained, of course, by any suitable constantly-acting friction-brake, but this increases the weight upon the car, and it will probably be found preferable to use a brake which shall act only when it is necessary to stop the reel. A simple construction for this purpose is shown in which a brake $l$ is pivoted at any suitable point, and provided at its rear end with an armature-plate 6 mounted opposite a magnet 20 connected by wires 7 to a contact-plate 8 on the cable $i$. The brake $l$ is weighted and thus pressed upon a friction-disk $m$ carried by the end of the reel, and to secure greater friction the end of the brake-arm may be inclined and engage with inclined teeth 9 on the disk, so that, by engagement with these inclined teeth, a more positive stop will be secured. When the circuit is broken on the car the magnet is de-energized and the brake applied by the spring, and it may be applied when the car slows up by arranging the magnet to act only at a certain current, so that when the current is partially cut off at the car for slowing up the magnet will be de-energized.

While the system has been shown and described in detail as one in which the cars move from the reels, it is obvious that substantially the same construction may be used with cars moving toward the reels, or with cars moving in either direction fed by the same service-cable, it being necessary only to provide suitable means for rotating the reels to take up the service-cables at the same rate of speed as the cars move, and to permit the cable to be drawn out and the motor end returned to the end of the section, which may be done either by a car moving in the opposite direction or otherwise. A car may be fed by the same service-cable over two sections, one on each side of the reel, moreover, by having the car move toward the reel over one section and from the reel over the other section, and a car or cars may thus travel in both directions over a line twice the length of the cable.

Any simple means may be used for driving the reels, arranged so as to be thrown into and out of operation, according as the car fed is moving toward or from the reel, and to secure the variation of the speed of the reel in accordance with the movement of the car. In Fig. 11 is shown a simple means for this purpose, in which a plurality of reels E are driven by a single shaft 21, to and from which any one of the reels may be clutched and unclutched by a friction-clutch 22, of any common form, shown as controlled by a hand-lever 23, the shaft being run at the highest rate of speed of the cars and the friction-clutch being adjusted to slip upon any excess of tension due to the stoppage or slowing up of the car. A suitable brake device will preferably be used to stop the reel when the car stops.

It is to be understood that by the term "stationary," applied to one end of the conductor in the specification and claims, I mean that the portion of the conductor connected with the source of power does not move with the vehicle by which it is fed, as does the end connected to the vehicle; but the movement of the vehicle is provided for by the length of the conductor, and I do not mean that this end or any part of the conductor need be motionless, as this will depend upon circumstances, such as the arrangement of the source of power employed and the manner in which the conductor is connected thereto.

The term "source of power," used herein, is not to be limited to a generator or other primary source of power, but is intended to cover any power producer, conductor, accumulator, or reservoir with which the service-conductor may be connected and from or through which it receives the power to be transmitted to the vehicle-motor.

The construction of the generator and transformers and the vehicle-motors and means on the vehicle for controlling the current have not been shown or described, as such constructions are common and well known and any one of many suitable constructions may be used in this system, as will be obvious to those skilled in the art.

What is claimed is—

1. In an electric railway, the combination with a suitable way, of a motor vehicle, a slotted conduit extending parallel with the way, an electric conductor having one end stationary and connected with a source of power, and a conducting arm carried by the motor vehicle and traveling in the slot and to which the electric conductor is connected within the conduit, substantially as described.

2. In an electric railway, the combination with a suitable way, of a motor vehicle, a slotted underground conduit extending parallel with the way, an electric conductor having one end stationary and connected with a source of power, and a conducting arm carried by the motor vehicle and traveling in the slot and to which the electric conductor is connected within the conduit, substantially as described.

3. In an electric railway, the combination with a suitable way, of a plurality of motor vehicles, a conduit extending parallel with the way, and a plurality of electric conductors for the same portion of the way, each having one end stationary and connected with a source of power and the other end passing through said conduit and moving with the motor vehicle fed by it and to which the electric conductor is connected within the conduit, substantially as described.

4. In an electric railway, the combination with a suitable way, of a plurality of motor vehicles, an underground conduit extending parallel with the way, and a plurality of electric conductors for the same portion of the way each having one end stationary and connected with a source of power and the other end passing through said conduit and moving with the motor vehicle fed by it, and to which the electric conductor is connected within the conduit, substantially as described.

5. In an electric railway, the combination with a suitable way, of a plurality of motor vehicles, a slotted conduit extending parallel with the way, and a plurality of electric conductors for the same portion of the way each having one end stationary and connected with a source of power and the other end connected with the motor vehicle within the conduit and moving with the vehicle fed by it, substantially as described.

6. In an electric railway, the combination with a suitable way, of a plurality of motor vehicles, a slotted underground conduit extending parallel with the way, and a plurality of electric conductors for the same portion of the way each having one end stationary and connected with a source of power and the other end connected with the motor vehicle within the conduit and moving with the vehicle fed by it, substantially as described.

7. In an electric railway, the combination with a suitable way, of a plurality of motor vehicles, a slotted conduit extending parallel with the way, a series of electric conductors each having one end stationary and connected with a source of power, and a conducting arm carried by each motor vehicle and traveling in the slot and to which the electric conductor by which the vehicle is fed is connected within the conduit, substantially as described.

8. In an electric railway, the combination with a suitable way, of a plurality of motor vehicles, a slotted underground conduit extending parallel with the way, a series of electric conductors each having one end stationary and connected with a source of power, and a conducting arm carried by each motor vehicle and traveling in the slot and to which the electric conductor by which the vehicle is fed is connected within the conduit, substantially as described.

9. In an electric railway, the combination with a suitable way, of a motor vehicle, a source of power, a stationary reel, an electric conductor on said reel having one end stationary and connected with the source of power and the other end connected to and moving with the motor vehicle, and driving mechanism for rotating the reel capable of being thrown in and out of operation to take up the conductor as the vehicle approaches the reel and permit the conductor to be drawn out when the vehicle has passed the reel, substantially as described.

10. In an electric railway, the combination with a suitable railway, of a motor vehicle, a source of power, a reel, an electric conductor on said reel having one end stationary and connected with the source of power and the other end connected to and moving with the vehicle, and means for checking the reel when the speed of the vehicle is decreased, substantially as described.

11. In an electric railway, the combination with a suitable way, of a motor vehicle, a source of power, a reel, an electric conductor on said reel having one end stationary and connected with the source of power and the other end connected to and moving with the vehicle, and a brake applied to check the reel when the speed of the vehicle is decreased, substantially as described.

12. In an electric railway, the combination with a suitable way, of a motor vehicle, a source of power, a reel, an electric conductor on said reel having one end stationary and connected with the source of power and the other end connected to and moving with the vehicle, and a brake applied to check the reel when the speed of the vehicle is decreased and controlled by the vehicle current, substantially as described.

13. In an electric railway, the combination with a suitable way, of a motor vehicle, a source of power, a reel, an electric conductor on said reel having one end stationary and connected with the source of power and the other end connected to and moving with the vehicle, and means for rotating said reel to take up the slack as the vehicle approaches the stationary end of the conductor, said means being constructed to secure the variation of the speed of rotation of the reel with that of the vehicle, substantially as described.

14. In an electric railway, the combination with a suitable way, of a motor vehicle, a conduit extending parallel with the way, an electric conductor passing through the conduit and having one end stationary and connected with a source of power and the other end connected to and moving with the motor vehicle, and antifriction devices for reducing the friction of the conductor in said conduit, substantially as described.

15. In an electric railway, the combination with a suitable way, of a plurality of motor vehicles, a conduit extending parallel with the way, a plurality of reels, and electric conductors for the same portion of the way on the reels, each passing through the conduit and having one end stationary and connected with a source of power, and the other end moving with the motor vehicle fed by it, and to which the electric conductor is connected within the conduit, substantially as described.

16. In an electric railway, the combination with a suitable way, of a plurality of motor vehicles, a conduit extending parallel with the way, a plurality of stationary reels, and electric conductors for the same portion of the way on the reels, each having one end stationary and connected with a source of power, and the other end passing through the conduit and moving with the motor vehicle fed by it and to which the electric conductor is connected within the conduit, substantially as described.

17. In an electric railway, the combination with a suitable way, of a plurality of motor vehicles, a conduit extending parallel with the way and provided with supports forming a series of ducts and a plurality of electric conductors passing through separate ducts in the conduit, and each having one end stationary and connected with a source of power and the other end connected to and moving with the vehicle which is fed by it, substantially as described.

18. In an electric railway, the combination with a suitable way, of a plurality of motor vehicles, a conduit extending parallel with the way and provided with supports forming a series of ducts, a plurality of electric conductors passing through separate ducts in the conduit, and each having one end stationary and connected with a source of power and the other end connected to and moving with the motor vehicle which is fed by it, and antifriction devices for said conductors, substantially as described.

19. In an electric railway, the combination with a suitable way, of a plurality of motor vehicles, a conduit extending parallel with the way and provided with supports forming a series of ducts, a plurality of electric conductors passing through separate ducts in the conduit, and each having one end stationary and connected with a source of power and the other end connected to and moving with the motor vehicle which is fed by it, and antifriction rollers in said ducts for supporting and guiding said conductors, substantially as described.

20. In an electric railway, the combination with a suitable way, of a plurality of motor vehicles, a slotted underground conduit extending parallel with the way and provided with supports forming a series of ducts, a plurality of stationary reels, and electric conductors on said reels, each having one end stationary and connected with a source of power and the other end passing through a duct in the conduit and connected through the slot with the motor vehicle fed by it and with which it moves, substantially as described.

21. In an electric railway, the combination with a suitable way, of a plurality of motor vehicles, a slotted underground conduit extending parallel with the way and provided with supports forming a series of ducts, a plurality of stationary reels, electric conductors on said reels, each having one end stationary and connected with a source of power and the other end passing through a duct in the conduit, and an arm carried by each motor vehicle and moving through said slot and connected to the end of the conductor within the conduit, substantially as described.

22. The combination with a slotted conduit having supports at the sides forming separate ducts for electric conductors moving with motor vehicles fed by them, of a motor vehicle having an arm passing through said slot and provided with a conductor carrier adjustable in position for connection with conductors in different ducts, substantially as described.

23. The combination with a slotted conduit circular in cross section and having supports at the sides forming separate ducts, of a motor vehicle having an arm passing through said slot and provided with a carrier arm pivoted concentrically with said conduit, whereby the carrier may be connected with conductors in different ducts, substantially as described.

24. In an electric railway, the combination with a conduit having supports at the sides forming separate ducts, of conductor supporting and guiding rollers in said ducts, substantially as described.

25. The combination with a motor arm, of the carrier $f$ carried by said arm, conductor $e$ in said arm and carrier, insulated contact piece 14 in said carrier with which said conductor connects, and head $g$ carried by cable $c$ and having insulated contact piece 16 with which the cable conductor connects, substantially as described.

26. The combination with a motor arm, of the carrier $f$ carried by said arm, conductor $e$ in said arm and carrier, insulated contact piece 14 in said carrier with which said conductor connects, head $g$ carried by cable $c$, and having insulated contact piece 16 with which the cable conductor connects, and a screw socket and nipple connection between said contact pieces, substantially as described.

27. The combination with a motor arm, of carrier $f$ carried by said arm and having a cable connection on one side between the ends, substantially as described.

28. The combination with a motor arm, of carrier $f$ carried by said arm and having a cable connection on one side between the ends within a recess and provided with longitudinal grooves 25 for the cable, substantially as described.

In testimony whereof I have hereunto set my hand in the presence of two subscribing witnesses.

THOMAS F. O'CONNOR.

Witnesses:
ARTHUR L. KENT,
C. J. SAWYER.